United States Patent
Marmo et al.

(10) Patent No.: US 9,994,267 B1
(45) Date of Patent: Jun. 12, 2018

(54) ACTIVE SIDE-SKIRTS FOR A MOTOR VEHICLE

(71) Applicant: GM GLOBAL TECHNOLOGY OPERATIONS LLC, Detroit, MI (US)

(72) Inventors: Anthony V. Marmo, Detroit, MI (US); Vijaya Sirangu, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/485,281

(22) Filed: Apr. 12, 2017

(51) Int. Cl.
  *B62D 35/00* (2006.01)
  *B62D 35/02* (2006.01)
  *B62D 37/02* (2006.01)

(52) U.S. Cl.
  CPC ........... *B62D 35/008* (2013.01); *B62D 35/02* (2013.01); *B62D 37/02* (2013.01)

(58) Field of Classification Search
  CPC ....... B62D 35/008; B62D 35/02; B62D 37/02
  USPC .......................................... 296/180.1, 180.3
  See application file for complete search history.

(56) References Cited

U.S. PATENT DOCUMENTS

| | | | | |
|---|---|---|---|---|
| 4,611,847 A | * | 9/1986 | Sullivan | B62D 35/001 296/180.2 |
| 7,188,875 B2 | * | 3/2007 | Norelius | B60R 13/00 293/118 |
| 8,235,432 B2 | * | 8/2012 | Ryan | B60R 19/38 280/163 |
| 8,303,025 B2 | * | 11/2012 | Senatro | B62D 35/001 180/903 |
| 8,899,660 B1 | * | 12/2014 | Praskovskaya | B62D 35/001 296/180.1 |
| 9,669,885 B1 | * | 6/2017 | Fahland | B62D 37/02 |
| 2016/0244107 A1 | * | 8/2016 | Ishiba | B62D 35/008 |
| 2017/0137075 A1 | * | 5/2017 | Povinelli | B62D 35/008 |

* cited by examiner

*Primary Examiner* — Joseph D. Pape
(74) *Attorney, Agent, or Firm* — Quinn IP Law

(57) ABSTRACT

A side-skirt system for a vehicle includes first and second side-skirts. The vehicle includes a vehicle body having a first body end facing oncoming ambient airflow when the vehicle is in motion, an opposing second body end, and first and second lateral body sides spanning a distance between the two body ends. The vehicle also includes at least one first road wheel proximate the first body end and at least one second road wheel proximate the second body end. The first and second side-skirts are mounted to the respective first and second lateral body sides between the respective first and second road wheels and configured to adjust respective magnitudes of aerodynamic disturbance at the lateral body sides when the vehicle is in motion. The system also includes a mechanism configured to shift the first and second side-skirts relative to the vehicle body and adjust the respective magnitudes of aerodynamic disturbance.

16 Claims, 3 Drawing Sheets

ACTIVE SIDE-SKIRTS FOR A MOTOR VEHICLE

INTRODUCTION

The disclosure relates to active side-skirts for enhancement of aerodynamics of a motor vehicle.

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may be used to achieve downforce in high-performance vehicles in order to improve vehicle traction and cornering abilities. The study is typically used to shape vehicle bodywork for achieving a desired compromise among the above characteristics for specific vehicle use.

A side-skirt is an aerodynamic device typically fitted to a vehicle body side between the vehicle's front and rear wheels. Such a side-skirt is generally positioned to extend from the vehicle body side and streamline ambient airflow around a same-side rear road wheel of the vehicle. Such positioning of the side-skirt and streamlining of the ambient airflow consequently reduces the aerodynamic drag on the vehicle at the subject body side. Such side-skirts are frequently found on racing cars where they are used to increase overall vehicle efficiency and maximum speed. Generally, the larger the area of the side-skirts, the lower is the aerodynamic drag of the vehicle body.

SUMMARY

A side-skirt system for a vehicle having a vehicle body arranged along a longitudinal body axis and including a first vehicle body end configured to face oncoming ambient airflow when the vehicle is in motion relative to a road surface, and a second body end opposing the first body end, and first and second lateral body sides spanning a distance between the first and second vehicle body ends. The vehicle also has at least one first road wheel arranged proximate the first vehicle body end and at least one second road wheel arranged proximate the second vehicle body end. The side-skirt system includes a first side-skirt configured to be mounted to the first lateral body side between the at least one first road wheel and the at least one second road wheel. The first side-skirt is configured to adjust a magnitude of aerodynamic disturbance at the first lateral body side when the vehicle is in motion.

The side-skirt system also includes a second side-skirt configured to be mounted to the second lateral body side between the at least one first road wheel and the at least one second road wheel. The second side-skirt is configured to adjust a magnitude of aerodynamic disturbance at the second lateral body side when the vehicle is in motion. The side-skirt system additionally includes a mechanism configured to selectively shift each of the first side-skirt and the second side-skirt relative to the vehicle body to thereby adjust the magnitude of aerodynamic disturbance generated by each of the first and second side-skirts on the vehicle body.

The mechanism may be configured to selectively extend and retract each of the first side-skirt and the second side-skirt relative to, i.e., respectively toward and away from, the road surface.

The mechanism may include a first actuator configured to selectively extend and retract the first side-skirt respectively toward and away from the road surface and a second actuator configured to selectively extend and retract the second side-skirt respectively toward and away from the road surface.

The first actuator may be configured to selectively extend and retract the first side-skirt out of and into the first lateral body side, while the second actuator may be configured to selectively extend and retract the second side-skirt into and out of the second lateral body side.

In an alternative embodiment, the first actuator may be configured to selectively pivot the first side-skirt relative to the first lateral body side, while the second actuator may be configured to selectively pivot the second side-skirt relative to the second lateral body side.

The first actuator may be configured to selectively extend and retract the first side-skirt respectively below and alongside the first lateral body side, while the second actuator may be configured to selectively extend and retract the second side-skirt respectively below and alongside the second lateral body side.

The side-skirt system may additionally include an electronic controller configured to regulate the mechanism.

The side-skirt system may additionally include a sensor configured to detect a speed of the vehicle relative to the road surface and communicate the detected speed to the controller.

The sensor may be configured to detect one of a rotating speed of the at least one first or second road wheel and a velocity of ambient airflow relative to the vehicle.

The controller may be programmed to selectively shift, via the mechanism, each of the first side-skirt and the second side-skirt according to a lookup table establishing a correspondence between a magnitude of shift of the first and second side-skirts and a magnitude of the detected speed of the vehicle relative to the road surface.

A vehicle employing such a side-skirt system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
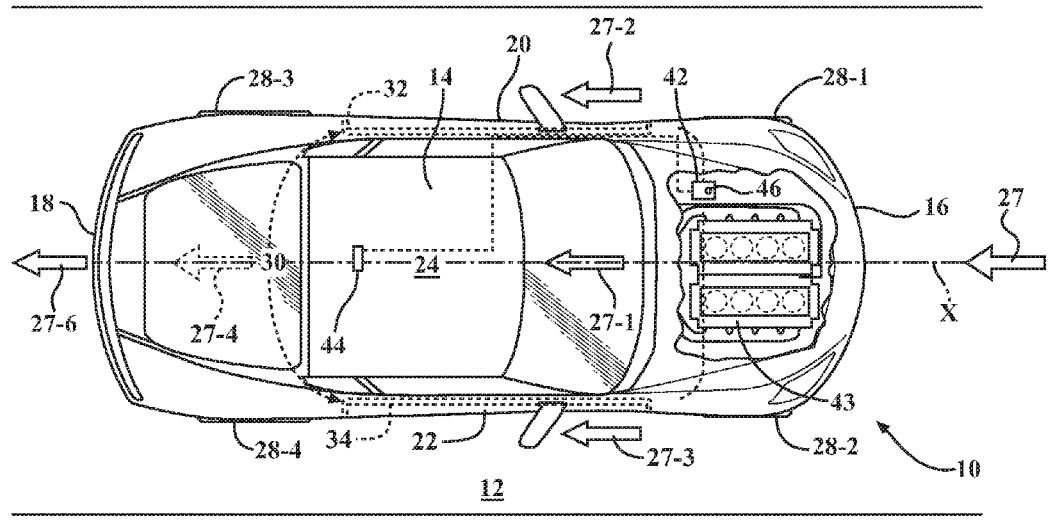
FIG. 1 is a schematic top view of a vehicle having a vehicle body arranged in a body plane along a longitudinal axis, and having a side-skirt system, shown in phantom, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26.

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and the fourth airflow portion 27-4 that passes under the vehicle body 14, between the underbody portion 26 and the road surface 12, but is not specifically shown. Therefore, the recirculating airflow region 27-6 is generally caused at elevated vehicle speeds by the flow of surrounding air around the six body sides of the vehicle body 14.

As shown in FIG. 1, the vehicle 10 also includes at least one first road wheel and at least one second road wheel. The at least one first road wheel is specifically shown as a left front road wheel 28-1 and a right front road wheel 28-2, while the at least one second road wheel is specifically shown as a left rear road wheel 28-3, and a right rear road wheel 28-4. The left front road wheel 28-1 and the right front road wheel 28-2 are arranged proximate the front end 16, while the left rear road wheel 28-3 and the right rear road wheel 28-4 are arranged proximate the rear end 18. Although two front wheels, 28-1 and 28-2, and two rear wheels, 28-3 and 28-4, are shown, nothing precludes the vehicle 10 from having as few as one front wheel and one rear wheel, or as many respective front and rear wheels as may be desired in response to a specific design of the vehicle.

Figure 2:
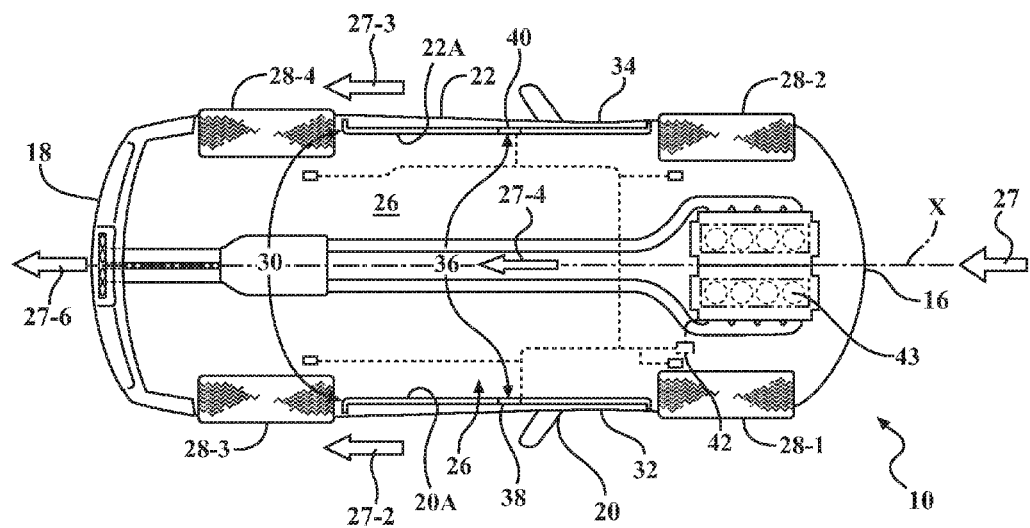
FIG. 2 is a schematic bottom view of the vehicle having an embodiment of the side-skirt system shown in FIG. 1, arranged on a vehicle underbody section along the vehicle longitudinal axis, according to the disclosure.

As shown in FIGS. 1 and 2, the vehicle 10 also includes a side-skirt system 30. The side-skirt system 30 includes a first or left-side dive-plane 32 configured to be moveably mounted to the first or left lateral body side 20 of the vehicle body 14. As shown, the left-side side-skirt 32 is mounted between the left front road wheel 28-1 and the left rear road wheel 28-3. The left side-skirt 32 is configured to streamline the second airflow portion 27-2 around the left rear road wheel 28-3 and, thereby, adjust a magnitude of aerodynamic disturbance Fm at the left side 20 of the vehicle body 14 when the vehicle 10 is in motion. The side-skirt system 30 includes a second or right-side dive-plane 34 configured to be moveably mounted to the second or right lateral body side 22 of the vehicle body 14. As shown, the right-side side-skirt 34 is mounted between the right front road wheel 28-2 and the right rear road wheel 28-4. The right side-skirt 34 is configured to streamline the third airflow portion 27-3 around the right rear road wheel 28-4 and, thereby, adjust a magnitude of aerodynamic disturbance $F_{D2}$ at the right side 22 of the vehicle body 14 when the vehicle 10 is in motion. As shown, the left-side and right-side side-skirts 32, 34 are arranged along, and in the shown embodiment substantially parallel to, the longitudinal body axis X, and also substantially parallel to the road surface 12. Each of the side side-skirts 32, 34 may be constructed from a rigid fracture-resistant material, such as steel, aluminum, carbon fiber, or specially formulated plastic.

As shown in FIG. 2, the dive-plane system 28 additionally includes a mechanism 36 configured to selectively shift each of the left-side side-skirt 32 and the right-side side-skirt 34 relative to the vehicle body 14. In general, the mechanism 36 is configured to selectively extend and retract each of the first side-skirt 32 and the second side-skirt 34 relative to, i.e., respectively toward and away from, the road surface 12. The mechanism 36 may be configured to selectively extend and retract each of the first side-skirt 32 and the second side-skirt 34 either individually or both side-skirts simultaneously. By individually shifting the left-side and the right-side side-skirts 32, 34, the mechanism 36 may separately adjust a magnitude of the respective aerodynamic disturbance $F_{D1}$ and disturbance FD2 generated by each of the first and second side-skirts on the vehicle body 14.

Specifically, the mechanism 36 may be configured to selectively shift each of the left-side side-skirt 32 and the right-side side-skirt 34 into and out of the space between the vehicle body 14 and the road surface 12. Such shifting of the left-side side-skirt 32 and the right-side side-skirt 34 may be employed to selectively deploy each side-skirt into the respective second airflow portion 27-2 and the third airflow portion 27-3, and retract the side-skirts therefrom and against or into the respective left and right sides 20, 22. Also, such shifting of the left-side side-skirt 32 and the right-side side-skirt 34 along the longitudinal body axis X may be employed to selectively increase and decrease the exposed areas of the side-skirts, to thereby increase and decrease the magnitude of the respective aerodynamic disturbance Fm and FD2 on the vehicle body 14. Each of the left-side side-skirt 32 and the right-side side-skirt 34 may be configured to retract into dedicated recesses 20A, 22A (shown in FIG. 2) defined by the respective left and right sides 20, 22. As such, the respective left-side and right-side side-skirts 32, 34 may be configured to slide within the respective recesses 20A, 22A.

The mechanism 36 may alternatively be configured to selectively, and either simultaneously or individually, rotate or pivot each of the left-side side-skirt 32 and the right-side side-skirt 34 (shown in FIG. 4) relative to the first vehicle body end 16 about a left side-skirt axis $X_L$ and a right side-skirt axis $X_R$. In the embodiment of the vehicle 10 shown in FIG. 1, the left and right side-skirt axes $X_L$, $X_R$ are generally disposed along the longitudinal body axis X. Such rotation of the left-side and right-side side-skirt 32, 34 is intended to change the side-skirts' position relative to the respective left and right body sides 20, 22. As a result, the rotation of the left-side side-skirt 32 and the right-side side-skirt 34 may adjust the magnitude of the respective aerodynamic disturbance $F_D$ $_{and}$ aerodynamic disturbance $F_{D2}$ generated at the respective left and right body sides 20, 22.

Figure 3:
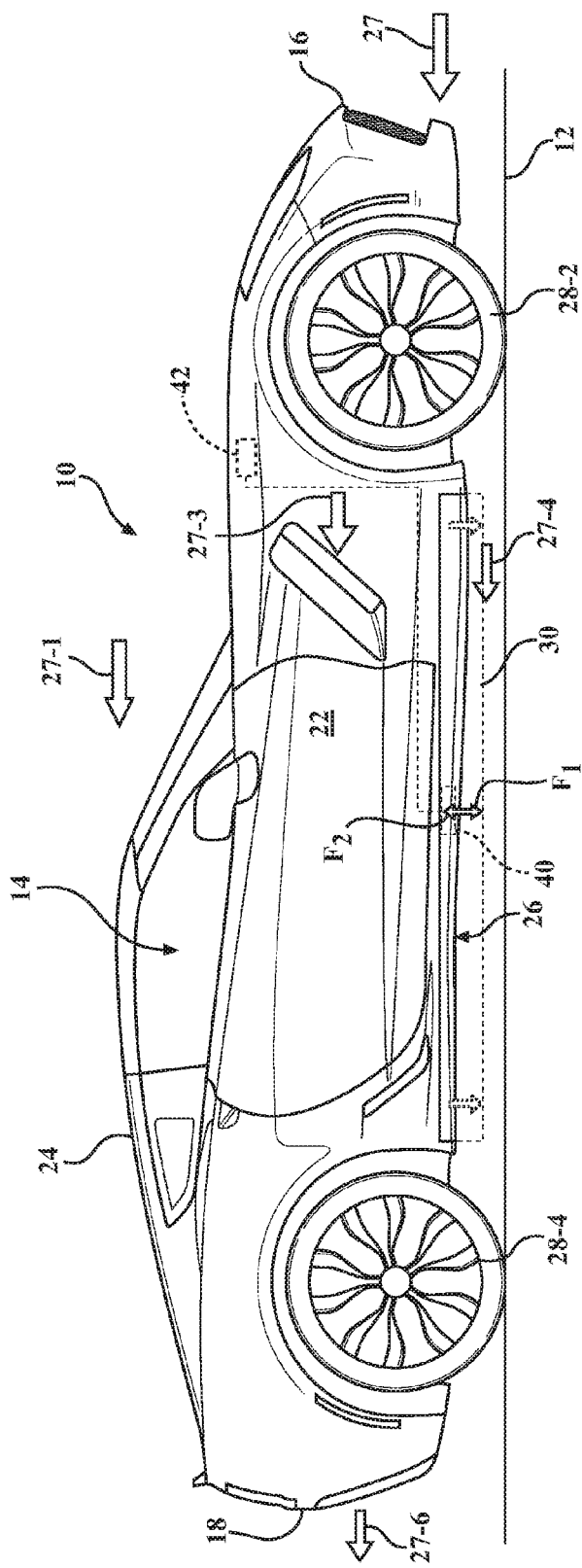
FIG. 3 is a schematic side view of the vehicle showing another embodiment of the side-skirt system, according to the disclosure.

The mechanism 36 may include a first actuator 38 operatively connected to the first side-skirt 32 and configured to selectively extend the first side-skirt toward and retract the first side-skirt away from the road surface 12. Additionally, the mechanism 36 may include a second actuator 40 operatively connected to the second side-skirt 34 and configured to selectively extend and retract the second side-skirt respectively toward and away from the road surface 12. Each of the first and second actuators 38, 40 may be configured as any appropriate device to operate the respective first and second side-skirt 32, 34, such as a linear actuator, a rotary actuator, and/or an electric motor (not shown). As shown in FIG. 2, the first actuator 38 may be configured to selectively extend and retract the first side-skirt 32 respectively out of and into the first or left lateral body side 20, while the second actuator 40 may be configured to selectively extend and retract the second side-skirt 34 respectively out of and into the second or right lateral body side 22. The first actuator 38 may be configured to selectively extend and retract the first side-skirt 32 respectively below and alongside the left side 20 (not shown), while the second actuator 40 may be configured to selectively extend and retract the second side-skirt 34 respectively below and alongside the right side 22, as shown in FIG. 3.

Figure 4:
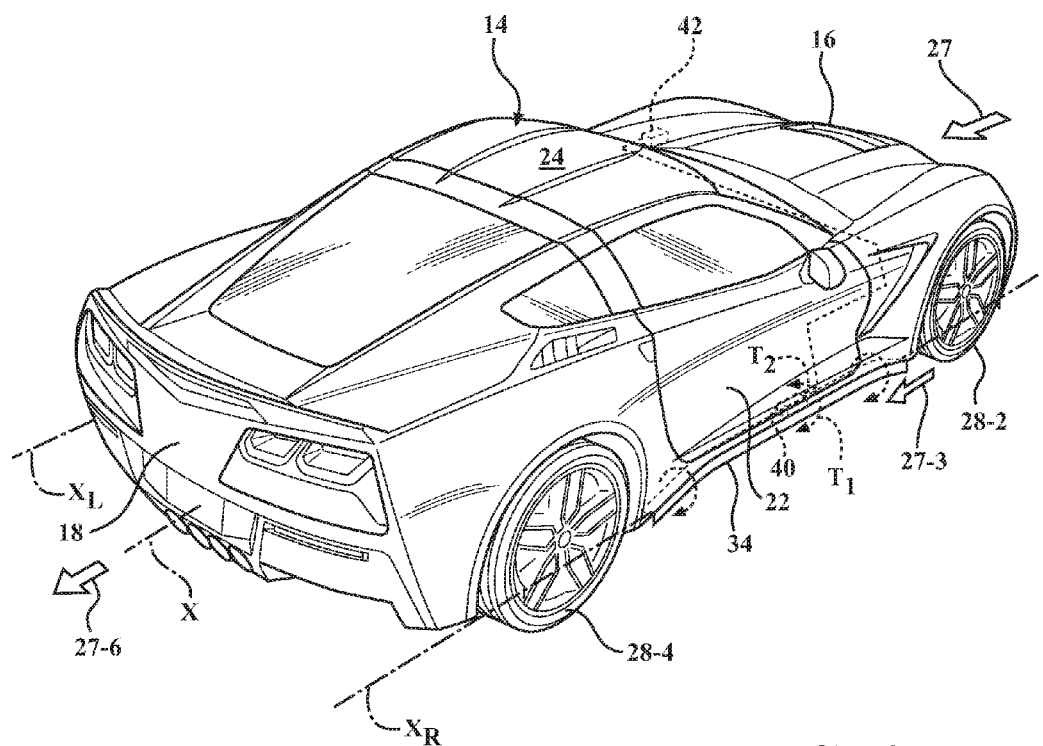
FIG. 4 is a schematic perspective rear view of the vehicle showing yet another embodiment of the side-skirt system, according to the disclosure

Alternatively, as shown in FIG. 4, the first actuator 38 may be configured to selectively pivot the first side-skirt 32 relative to the left side 20, and the second actuator 40 may be configured to selectively pivot the second side-skirt 34 relative to the right side 22. Accordingly, as shown in FIG. 3, in the respective embodiments discussed above, each of the actuators 38, 40 may be configured to apply a force F1 to shift the respective first and second side-skirts 32, 34 in one direction and an opposite force F2 to shift the subject side-skirts in the opposite direction. Alternatively, as shown in FIG. 4, each of the actuators 38, 40 may be configured to apply a torque T1 to rotate the respective first and second side-skirts 32, 34 in one direction and an opposite torque T2 to shift the subject side-skirts in the opposite direction.

In an alternative configuration, the mechanism 36 may include a single actuator operatively connected to each of the first and second side-skirts 32, 34 through an appropriate force transmitting linkage (not shown) and configured to simultaneously selectively extend and retract the first and second side-skirts respectively toward and away from the road surface 12. In such an alternative configuration, the single actuator may be employed either to extend and retract the first and second side-skirts 32, 34 out of and into the respective left and right lateral body side 20, 22, or to selectively pivot the first and second side-skirts 32, 34 relative to the respective left and right sides 20, 22. Accordingly, in such an alternative configuration, the single actuator may be configured to apply a force to shift the respective first and second side-skirts 32, 34 in one direction and an opposite force to shift the subject side-skirts in the opposite direction. Alternatively, the single actuator may be configured to apply a torque to rotate the respective first and second side-skirts 32, 34 in one direction and an opposite torque to shift the subject side-skirts in the opposite direction.

As shown in FIGS. 1-4, the vehicle 10 also includes an electronic controller 42 configured, i.e., constructed and programmed, to regulate the mechanism 36. The controller 42 may be configured as a central processing unit (CPU) configured to regulate operation of, among other systems, an internal combustion engine 43 (shown in FIGS. 1 and 2), a hybrid-electric powertrain (not shown), or other alternative types of powerplants, as well as other vehicle systems, including the side-skirt system 30. The controller 42 may also be configured as a dedicated body controller configured to regulate the side-skirt system 30, and, specifically, the mechanism 36. In order to appropriately control operation of the mechanism 36, the controller 42 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 42 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 42 may also include a separate disk, magnetic tape, any other magnetic medium, a CD-ROM, DVD, any other optical medium, etc. The controller 42 may be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 42 or accessible thereby may be stored in the memory and automatically executed to provide the required functionality.

As shown in FIGS. 1 and 2, the side-skirt system 30 may additionally include a sensor 44 arranged on the vehicle 10, configured to detect a speed of the vehicle 10 relative to the road surface 12, and in operative communication with the controller 42. The sensor 44 may be configured to detect a rotating speed of at least one of the road wheels, 28-1, 28-2, 28-3, and 28-4 and communicate the detected road wheel rotating speed to the controller 42. The sensor 44 may be configured to detect a velocity of ambient airflow 27 relative to the vehicle body 14 and communicate the detected ambient airflow velocity to the controller 42. For example, the sensor 44 may be a pitot tube configured to detect a pressure of the ambient airflow 27 at a specific location relative to the vehicle body 14, and the controller 42 may correlate the measured pressure to airflow velocity. The controller 42 may be additionally configured to correlate the data received from the particular sensor 44 to road speed of the vehicle 10.

The controller 42 may be additionally programmed with a lookup table 46 (shown in FIG. 1) establishing correspondence between a magnitude of shift of the first and second side-skirts 32, 34 and a magnitude of the detected speed of the vehicle 10 relative to the road surface 12 for affecting appropriate regulation of the mechanism 36. The lookup table 46 may be developed empirically during validation and testing of the vehicle 10. As the position of the first and second side-skirts 32, 34 is varied relative to the respective body sides 20, 22 during operation of the vehicle 10 in response to variation in road speeds, the side-skirt system 30 may adjust the respective disturbance Fm and disturbance $F_{D2}$ at the respective body sides 20, 22 to affect aerodynamic efficiency, i.e., the drag coefficient of the vehicle body 14.

As the vehicle 10 moves relative to the road surface 12 and through the oncoming ambient airflow 27, the second airflow portion 27-2 passes over the left side 20 and an extended first side-skirt 32, while the third airflow portion 27-3 passes over the right side 22 and an extended second side-skirt 34. In such extended position, the first and second side-skirts 32, 34 reduce interaction of the second and third airflow portions 27-2, 27-3 with the fourth airflow portion 27-4 that passes under the vehicle body 14, and thereby minimize turbulence created by such an interaction. Additionally, the extended position of the first and second side-skirts 32, 34 helps guide the fourth airflow portion 27-4 away from the rear road wheels 28-3, 28-4. As a result, at elevated vehicle speeds, the extended first and second side-skirts 32, 34 facilitate an increase in air pressure at the recirculating airflow region 27-6 and thereby reduce aerodynamic drag of the vehicle body 14. Consequently, the above described extension of the first and second side-skirts 32, 34 toward the road surface 12 is configured to reduce a magnitude of the aerodynamic drag on the vehicle body 14 at elevated road speeds, which improves overall efficiency of the vehicle 10, e.g., reduces high speed fuel consumption of the engine 43 and improves the vehicle's high speed acceleration.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A side-skirt system for a vehicle having a vehicle body arranged along a longitudinal body axis and including a first vehicle body end configured to face oncoming ambient airflow when the vehicle is in motion relative to a road surface, a second body end opposing the first body end, and first and second lateral body sides spanning a distance between the first and second vehicle body ends, and having at least one first road wheel arranged proximate the first vehicle body end and at least one second road wheel arranged proximate the second vehicle body end, the side-skirt system comprising:
   a first side-skirt configured to be mounted to the first lateral body side between the at least one first road wheel and the at least one second road wheel and configured to adjust a magnitude of aerodynamic disturbance at the first lateral body side when the vehicle is in motion;
   a second side-skirt configured to be mounted to the second lateral body side between the at least one first road wheel and the at least one second road wheel and configured to adjust a magnitude of aerodynamic disturbance at the second lateral body side when the vehicle is in motion;
   a mechanism configured to selectively shift each of the first side-skirt and the second side-skirt relative to the vehicle body to thereby adjust the magnitude of aerodynamic disturbance generated by each of the first and second side-skirts on the vehicle body;
   an electronic controller configured to regulate the mechanism; and
   a sensor configured to detect a speed of the vehicle relative to the road surface and communicate the detected speed to the electronic controller;
   wherein the electronic controller is programmed to selectively shift, via the mechanism, each of the first side-skirt and the second side-skirt according to a lookup table establishing a correspondence between a magnitude of shift of the first and second side-skirts and a magnitude of the detected speed of the vehicle relative to the road surface.

2. The side-skirt system according to claim 1, wherein the mechanism is configured to selectively extend and retract each of the first side-skirt and the second side-skirt respectively toward and away from the road surface.

3. The side-skirt system according to claim 2, wherein the mechanism includes a first actuator configured to selectively extend and retract the first side-skirt respectively toward and away from the road surface and a second actuator configured to selectively extend and retract the second side-skirt respectively toward and away from the road surface.

4. The side-skirt system according to claim 3, wherein the first actuator is configured to selectively extend and retract the first side-skirt out of and into the first lateral body side, and the second actuator is configured to selectively extend and retract the second side-skirt into and out of the second lateral body side.

5. The side-skirt system according to claim 3, wherein the first actuator is configured to selectively pivot the first side-skirt relative to the first lateral body side, and the second actuator is configured to selectively pivot the second side-skirt relative to the second lateral body side.

6. The side-skirt system according to claim 3, wherein the first actuator is configured to selectively extend and retract the first side-skirt respectively below and alongside the first lateral body side, and the second actuator is configured to selectively extend and retract the second side-skirt respectively below and alongside the second lateral body side.

7. The side-skirt system according to claim 1, wherein the sensor is configured to detect one of a rotating speed of the at least one first or second road wheel and a velocity of ambient airflow relative to the vehicle.

8. A vehicle comprising:
   a vehicle body arranged along a longitudinal body axis and including a first vehicle body end configured to face oncoming ambient airflow when the vehicle is in motion relative to a road surface, a second body end opposing the first body end, and first and second lateral body sides spanning a distance between the first and second body end;
   at least one first road wheel arranged proximate the first vehicle body end;
   at least one second road wheel arranged proximate the second vehicle body end; and
   a side-skirt system including:
      a first side-skirt mounted to the first lateral body side between the at least one first road wheel and the at least one second road wheel, and configured to adjust a magnitude of aerodynamic disturbance at the first lateral body side when the vehicle is in motion;
      a second side-skirt mounted to the second lateral body side between the at least one first road wheel and the at least one second road wheel, and configured to adjust a magnitude of aerodynamic disturbance at the second lateral body side when the vehicle is in motion;
      a mechanism configured to selectively shift each of the first side-skirt and the second side-skirt relative to the vehicle body to thereby adjust the magnitude of aerodynamic disturbance generated by each of the first and second side-skirts on the vehicle body;

an electronic controller configured to regulate the mechanism; and a sensor configured to detect a speed of the vehicle relative to the road surface and communicate the detected speed to the electronic controller;

wherein the electronic controller is programmed to selectively shift, via the mechanism, each of the first side-skirt and the second side-skirt according to a lookup table establishing a correspondence between a magnitude of shift of the first and second side-skirts and a magnitude of the detected speed of the vehicle relative to the road surface.

9. The vehicle according to claim 8, wherein the mechanism is configured to selectively extend and retract each of the first side-skirt and the second side-skirt respectively toward and away from the road surface.

10. The vehicle according to claim 9, wherein the mechanism includes a first actuator configured to selectively extend and retract the first side-skirt respectively toward and away from the road surface and a second actuator configured to selectively extend and retract the second side-skirt respectively toward and away from the road surface.

11. The vehicle according to claim 10, wherein the first actuator is configured to selectively extend and retract the first side-skirt out of and into the first lateral body side, and the second actuator is configured to selectively extend and retract the second side-skirt into and out of the second lateral body side.

12. The vehicle according to claim 10, wherein the first actuator is configured to selectively pivot the first side-skirt relative to the first lateral body side, and the second actuator is configured to selectively pivot the second side-skirt relative to the second lateral body side.

13. The vehicle according to claim 10, wherein the first actuator is configured to selectively extend and retract the first side-skirt respectively below and alongside the first lateral body side, and the second actuator is configured to selectively extend and retract the second side-skirt respectively below and alongside the second lateral body side.

14. The vehicle according to claim 8, wherein the sensor is configured to detect one of a rotating speed of the at least one first or second road wheel and a velocity of ambient airflow relative to the vehicle.

15. The vehicle according to claim 1, wherein the first lateral body side defines a first recess and the second lateral body side defines a second recess, and wherein the first side-skirt is configured to retract into and slide within the first recess and the second side-skirt is configured to retract into and slide within the second recess.

16. The vehicle according to claim 8, wherein the first lateral body side defines a first recess and the second lateral body side defines a second recess, and wherein the first side-skirt is configured to retract into and slide within the first recess and the second side-skirt is configured to retract into and slide within the second recess.

* * * * *